US008180329B2

(12) United States Patent
Ratnakar

(10) Patent No.: US 8,180,329 B2
(45) Date of Patent: May 15, 2012

(54) METHOD AND SYSTEM FOR DETERMINING POPULARITY OF AN ENTERPRISE AND ASSOCIATING A RANKING FACTOR BASED ON POPULARITY WITH CONTACT INFORMATION FOR THE ENTERPRISE STORED LOCALLY ON A COMMUNICATION DEVICE

(75) Inventor: Nitesh Ratnakar, Elkins, WV (US)

(73) Assignee: Novation Science Holding, LLC, Elkins, WV (US)

( * ) Notice: Subject to any disclaimer, the term of this patent is extended or adjusted under 35 U.S.C. 154(b) by 883 days.

(21) Appl. No.: 11/966,020

(22) Filed: Dec. 28, 2007

(65) Prior Publication Data

US 2009/0171934 A1 Jul. 2, 2009

(51) Int. Cl.
*H04M 3/42* (2006.01)

(52) U.S. Cl. ................ 455/414.1; 455/404.2; 455/456.1

(58) Field of Classification Search ............... 455/414.1, 455/557, 404.2, 456.1

See application file for complete search history.

(56) References Cited

U.S. PATENT DOCUMENTS

| | | | | |
|---|---|---|---|---|
| 5,930,699 | A | 7/1999 | Bhantia | |
| 6,133,853 | A | 10/2000 | Obradovich | |
| 6,148,261 | A | 11/2000 | Obradovich | |
| 6,434,381 | B1 | 8/2002 | Moore et al. | |
| 6,515,595 | B1 | 2/2003 | Obradovich | |
| 6,525,768 | B2 | 2/2003 | Obradovich | |
| 6,529,824 | B1 | 3/2003 | Obradovich | |
| 6,546,002 | B1 | 4/2003 | Kim | |
| 6,587,835 | B1 | 7/2003 | Treyz | |
| 6,629,136 | B1 | 9/2003 | Naidoo | |
| 6,707,421 | B1 | 3/2004 | Drury | |
| 6,771,290 | B1 | 8/2004 | Hoyle | |
| 6,812,888 | B2 | 11/2004 | Drury | |
| 6,868,335 | B2 | 3/2005 | Obradovich | |
| 6,898,434 | B2 | 5/2005 | Pradhan | |
| 6,924,748 | B2 | 8/2005 | Obradovich | |
| 6,965,868 | B1 | 11/2005 | Bednarek | |
| 7,113,110 | B2 | 9/2006 | Horstemeyer | |
| 7,116,985 | B2 | 10/2006 | Wilson | |
| 7,127,261 | B2 | 10/2006 | Van Erlach | |
| 7,133,834 | B1 | 11/2006 | Abelow | |
| 7,167,553 | B2 | 1/2007 | Shaffer | |
| 7,170,852 | B1 | 1/2007 | Adler | |
| 7,174,301 | B2 | 2/2007 | Florance | |
| 7,181,227 | B2 | 2/2007 | Wilson | |
| 2005/0001743 | A1 | 1/2005 | Haemerle | |
| 2005/0032527 | A1* | 2/2005 | Sheha et al. | 455/456.1 |
| 2007/0026842 | A1* | 2/2007 | Haave et al. | 455/404.2 |
| 2008/0261568 | A1* | 10/2008 | Lopez et al. | 455/414.1 |

OTHER PUBLICATIONS

U.S. Appl. No. 09/931,896, filed Mar. 21, 2002, Lessard.
U.S. Appl. No. 09/841,268, filed Jan. 31, 2002, Janik.

* cited by examiner

*Primary Examiner* — Phuoc Doan
(74) *Attorney, Agent, or Firm* — Mitchell Law PLLC; Matthew W. Mitchell

(57) ABSTRACT

Electronic interaction with an enterprise is tracked and used to determine the popularity of the enterprise. A ranking factor is determined for each enterprise from the popularity and associated with contact information for the enterprise. The ranking factor is transmitted to a communication device containing the contact information wherein the ranking factor is associated with the contact information. The ranking factor may be used to sort the enterprises having contact information stored on the communication device in response to a user-initiated search query.

14 Claims, 7 Drawing Sheets

METHOD AND SYSTEM FOR DETERMINING POPULARITY OF AN ENTERPRISE AND ASSOCIATING A RANKING FACTOR BASED ON POPULARITY WITH CONTACT INFORMATION FOR THE ENTERPRISE STORED LOCALLY ON A COMMUNICATION DEVICE

FIELD OF THE INVENTION

The present invention relates generally to the presentation of contact information in response to a search query and, more particularly, to a method and system for ranking various enterprises based, at least in part, on the "popularity" of the enterprises and associating a ranking factor derived therefrom with the contact information for each enterprise.

BACKGROUND OF THE INVENTION

In addition to enabling voice-to-voice communication, modern mobile communication devices enable users to send and receive data as well as video. Many mobile communication devices also enable users to access the Internet through dedicated web interfaces, that allow the users to visit websites, including those that search for and provide contact information for businesses and individuals. As with traditional communication devices, mobile phone users frequently dial an information or directory service provider, such as the *411 service in the United States. With these services, the caller usually speaks directly with an operator to locate the contact information in an electronic database based on information provided by the caller and then either verbally relays that contact information to the caller or activates an automated feature that verbally provides the contact information to the caller.

Recently, a voice-based, automated search technology that provides directory assistance and other benefits for mobile-phone users has been developed. To access the service users dial a dedicated number and provide general information regarding the desired contact information to an automated operator. The automated operator, using speech recognition and search tools, searches an electronic database for businesses that match, or otherwise relate to, the general information provided by the caller. In its simplest implementation, the caller is prompted for a business name and location, and the automated system searches the database for business matching those criteria. In a more advanced implementation, the caller can provide more general information, such as business type and general location, such an intersection or postal code. The service will then search the database for businesses matching those criteria and then verbally read off a list of the businesses that fit the criteria and then allow the caller to verbally select a business for which to receive the contact information or precise location.

In another proposed system, a caller verbally provides general information, i.e., terms for a search query, and the results of the search are routed to the caller's mobile device and displayed on the display screen of device. Thus, in addition to basic contact information, such as business name, address, and telephone number, the caller could also be automatically provided with a map showing the business' location. Such a service therefore allows a caller to perform a search for a pizza parlor, for example, based on general location, receive the telephone number for the parlor, order the pizza, and map to the parlor for pickup of the pizza by simply calling the automated service. For the system to provide this level of functionality, the mobile device must include software that interfaces with the service.

Another service has been proposed that allows a mobile device user to forward a text message to an automated system identifying terms for a search query, and wherein the results of that search are provided in a reply text message. With this proposed system, the user inputs search terms into a dedicated search engine accessed through the mobile device or provides the aforementioned text message. The results of the search are then supplied in a text message identifying various attributes for the search results, such as business name, contact information, and location.

The contact information provided to the caller, either displayed on the screen of the device or in a separate text message, is unsorted or minimally sorted. That is, if the search results are sorted, they are sorted alphabetically, which may be of little importance for the caller. For example, if a caller searches for contact information in the category of "pizza restaurants" in Rogers Park, Chicago, Ill. or postal code 66060, the results of the search query will be in the form of either an unsorted list or an alphabetical list identifying the pizza restaurants generally located at or near the specified location. Some present services, especially GPS enabled services, sort the contact information generated in response to a query according to the location of corresponding businesses with respect to the location of the caller. Thus, for the aforementioned example, the system sorts the results of the search query according to the proximity of pizza restaurants to the location.

While proximity to a given location may be the most important for some callers, for other callers, other factors may be equally or more important. For these callers, the results must be searched on the mobile device by the caller. If the number of businesses listed is voluminous, such searching can be particularly time-consuming and cumbersome. By limiting the presentation of the search results to either a randomized order or an alphabetical order, it is difficult for a caller to rank the results based on other factors. In other words, the functionality of these proposed systems is limited because the presentation of the search results is tailored to the organization of the data itself rather than the preferences of the caller.

SUMMARY OF THE INVENTION

The present invention directed to a method and system in which the results of a search query, initiated with and displayed on a mobile communications device, such as a mobile phone, are sorted based on popularity. In one representative application, businesses are assigned a rank weight based on predetermined criteria of popularity, such as number of incoming and outgoing phone calls, visitors to business website, volume of credit card transactions, and the like.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate the best mode presently contemplated of carrying out the invention.

In the drawings.

DETAILED DESCRIPTION OF THE INVENTION

The present invention is directed to a method and system in which the results of a search query, initiated with and displayed on a mobile communications device, such as a mobile phone, are sorted based on popularity. In this regard, the invention uses software, hardware, and firmware for downloading contact information of businesses into the contact list of mobile communication devices, such as described in U.S. Ser. No. 11/164,318, the disclosure of which is incorporated herein.

Figure 1:
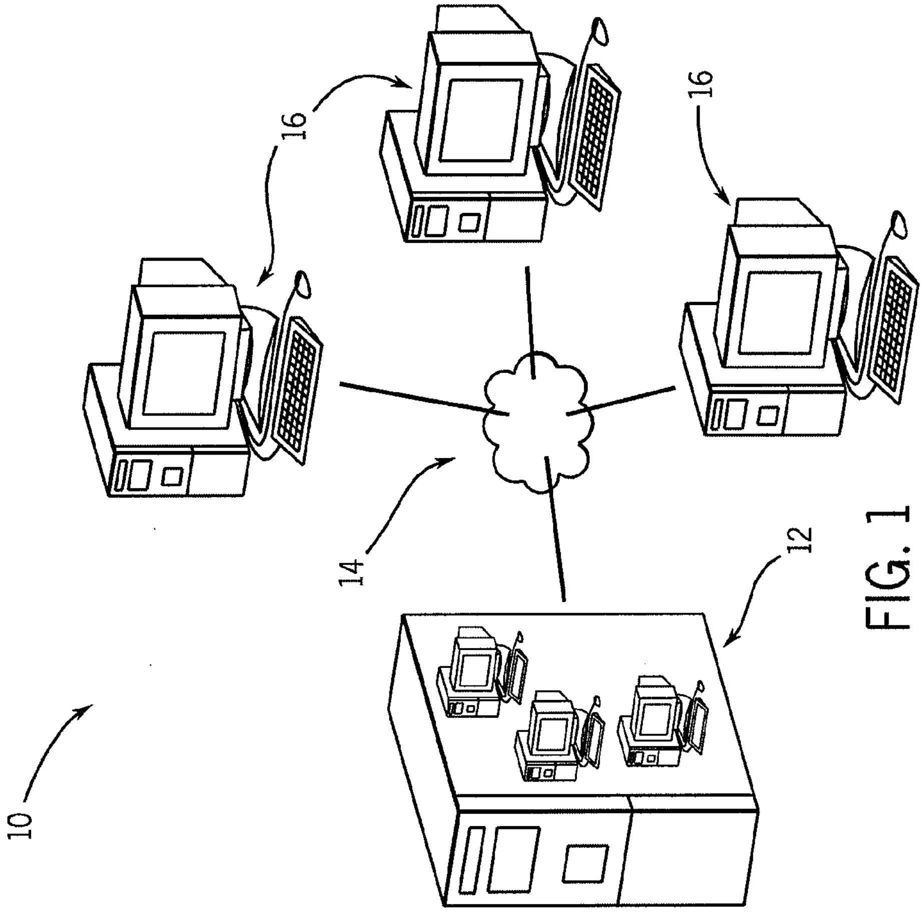
FIG. 1 is a schematic representation of a computer system containing a centralized server and multiple remote workstations.

Referring now to FIG. 1 a centralized data system 10 includes a central server 12 that maintains one or more databases containing contact information for businesses and other enterprises, including, for example, charities, libraries, government offices, recreational centers, and schools. For purposes of this application, the term shall "enterprise" shall designate any private or public facility that maintains a physical address. The contact information is stored on the database and updated in a known manner. Additionally, while only one server is shown, it is contemplated that the central server may comprise multiple servers communicatively coupled to one another in a known manner. Further, the servers may include primary servers as well as secondary or redundant servers that maintain backup copies of the data contained on the primary servers. Additionally, the server(s) 12 may be communicatively linked in a known manner, generally represented at numeral 14, with one or more remote workstations 16 containing I/O devices and software for updating the information stored on the server(s). The workstations 16 may also be networked directly with one another in a known manner. The workstations 16 may also be remote from one or more of the server(s).

Figure 2:
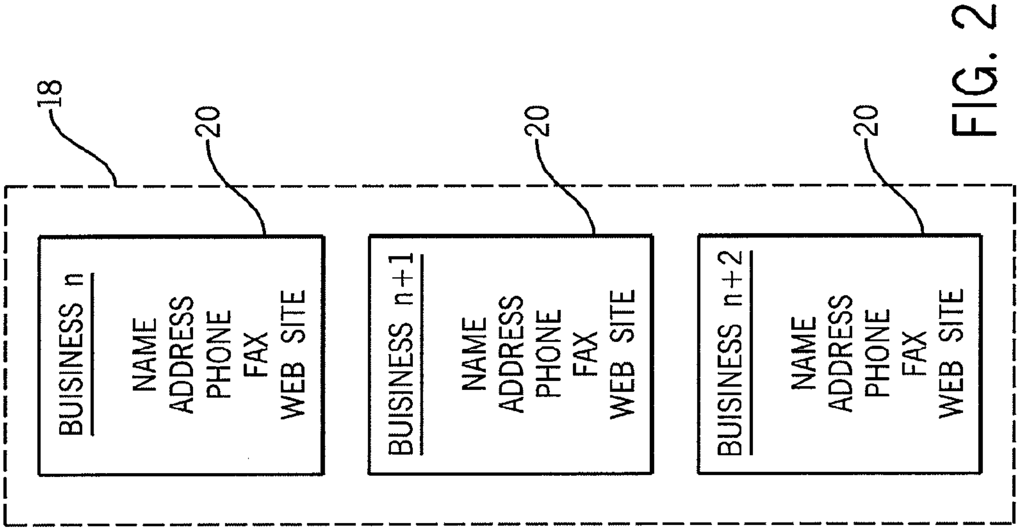
FIG. 2 is a schematic representation of a database containing data blocks of contact information for enterprises.

In one representative embodiment, the database 18, schematically shown in FIG. 2, includes a data block 20 for each enterprise. In one embodiment, the following information for each enterprise is maintained in a respective data block 20 for each enterprise: name, telephone number(s), address, fax number, if any, email address(es), if any, website address, if any. It is understood that the above fields are representative and that the information stored for each enterprise may include additional information not listed above. It is understood that the data in each data block can be arranged in a known manner, using commercially available or proprietary database management tools.

The contact information maintained in database 18 may also be linked with additional third party information associated with the various enterprises for whom contact information is stored. For example, server 12 may be communicatively linked with the computer systems of credit card providers 22, mobile phone service provides 24, landline telephone service providers 26, website hosts 28, and the enterprises 30 themselves. As will be described below, this additional information can be used to assign a "popularity" factor to each of the listed enterprises so such information is taken into account when search results are displayed to a caller.

It is understood that interfaces, such as web portals, may be used to allow the additional information to be input to the server 12 directly by the collector of such information. Alternately, the additional information could be obtained automatically using scheduled data transfer protocols, as is known.

This additional information may include, for example, number of incoming telephone calls, number of credit card transactions used to purchase goods or services from the enterprise, number of hits to the web pages for the enterprises, number indicative of daily foot traffic, number of sales, amount of revenue, amount of sales tax paid, and the like.

In one implementation, inbound calls to and outbound calls from a businesses and individuals whose contact information is saved in the central server 12 is automatically transmitted from the telephone devices themselves. For example, and the mobile and landline phones may maintain log of incoming and outgoing calls and transmit the call log; along with an ID identifying the communication device to the central server 12. A call interceptor may be connected on one end to the phone outlet and the other end to the phone. Alternatively, the current interceptor can be incorporated into communication device itself. The call interceptor includes a modem, memory card and processor that captures incoming and outgoing caller ID information and saves the information in the memory card. The call interceptor may be programmed to transmit caller ID information stored in the memory card to the central server at predetermined intervals. Alternatively, the call interceptor can be programmed to transmit caller ID information to the central server whenever a call is intercepted. In the central server, the caller ID information is stored and associated with the contact information for that enterprise.

More particularly, the central server 12 maintains a central server call log for each enterprise and the contact information of that enterprise is associated with the call log. As the call log effectively tracks incoming and outgoing calls, the information contained in the log may be beneficial for advertising and marketing efforts. Thus, it is contemplated that the call log can be provided to the enterprises, or a third party. The central server call log can further be grouped into one of many sub categories. Some illustrative examples of sub categories are: 1) incoming calls to a local business within a specified time period; 2) incoming calls to a local business from a pre defined list of callers, such as calls from a certain area code, postal code, etc.; 3) incoming calls from a specified set of callers; example calls from callers with a pre defined mean income, age, gender, etc.

As noted above, in one implementation, "popularity" factors are taken into consideration when providing the results of a search query. In this regard, each logged call may be assigned a rank weight based on one or more characteristics of the call. For example, weighting may be determined based on the geographical area from where the call was placed determined, the home area code for the device that placed the call, or the postal code associated with the address for the responsible party for the communication device. It is understood that the server may communicate with one or more other servers having databases containing information to enable the server to determine the responsible party for the communication device. From this information, the server 12, which includes suitable software, may make assumptions regarding other characteristics based on the logged call. For example, an assumption could be made regarding the net worth or income of the person responsible for the communication device. Other assumptions include, based on access to relevant census data, credit score of individuals and businesses, size of family, number of automobiles owned by the caller, age of the caller, education of the caller, and the like. Thus, in addition to basic geographical information, e.g., from where was the call placed, other information may be derived and used to assign a rank weight to each logged call.

Figure 4:
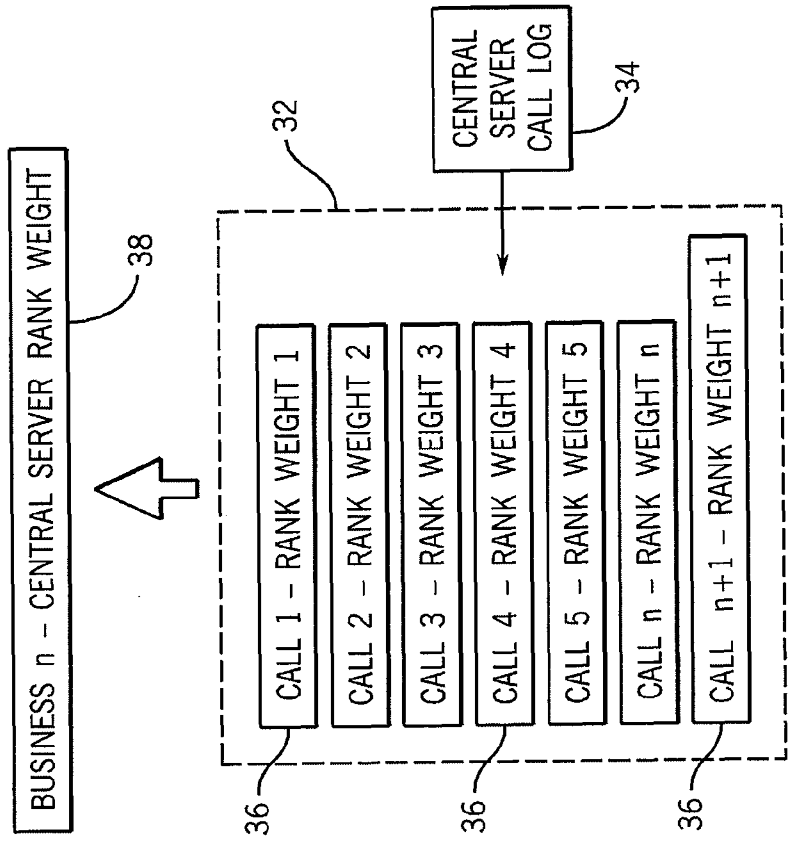
FIG. 4 is a schematic representation of illustrating how a ranking factor is determined for a given enterprise based on telephone calls involving the enterprise according to one aspect of the invention.
Figure 3:
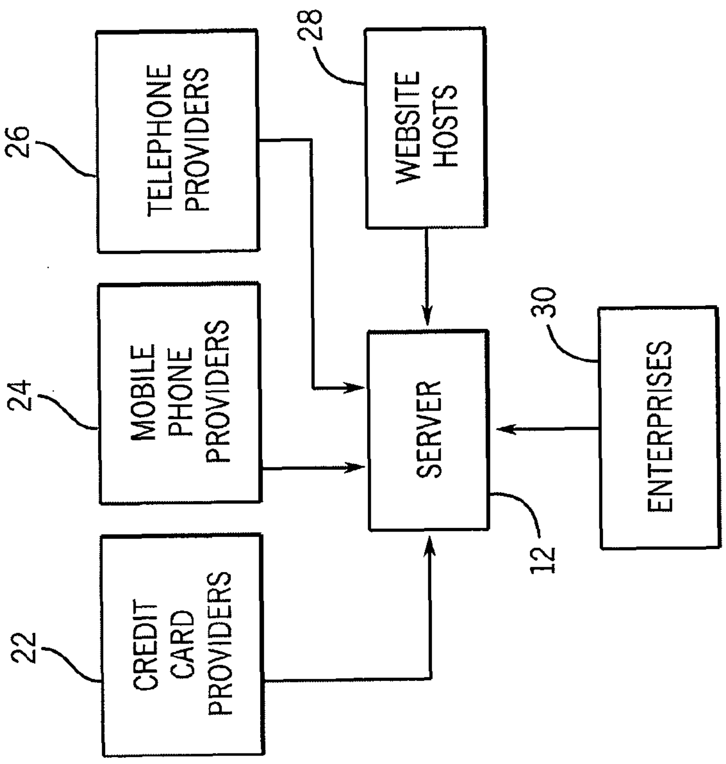
FIG. 3 is a schematic representation showing remote communication of a server with various remote systems that track electronic communication with an enterprise.

Referring now to FIG. 4, a call log 32 is maintained for each enterprise. The call log 32 is populated by the server 12 based on the calls logged in the central server call log 34. Each logged call 36 is assigned a rank weight, as will be described below. In one implementation, the sum of the rank weights for the enterprise, shown at 38, is derived from all of the calls contained in the call log for the enterprise. It is recognized that other statistical evaluations may be used to assign a rank weight for an enterprise.

It is recognized that discriminating protocols may be used to exclude certain logged calls from consideration in determining a rank weight for an enterprise. For example, acceptance criteria may be assigned so that only calls from defined geographic area, calls during pre defined time period, or calls from select business category etc. are incorporated into the central server call log. Information for calls that fall outside of the acceptance criteria may be logged in a separate server call log or discarded entirely.

Generating acceptance criteria based on local market conditions is believed to enhance the relevancy of contact information ranking engine. Moreover, it is understood that statistically filtering techniques may be used so that the rank weight of an enterprise is not skewed by an abnormal rank weight for a given logged call.

As referenced to above, the present invention is directed to a method and system for providing ranking information for an enterprise to a caller seeking contact information for the enterprise. In this regard, the central server 12 correlates the rank weight for an enterprise with the contact information with that enterprise. In one implementation, the database containing the contact information is updated to include the rank weight information; however, it is contemplated that separate databases may be maintained and linked in a known manner.

Figure 5:
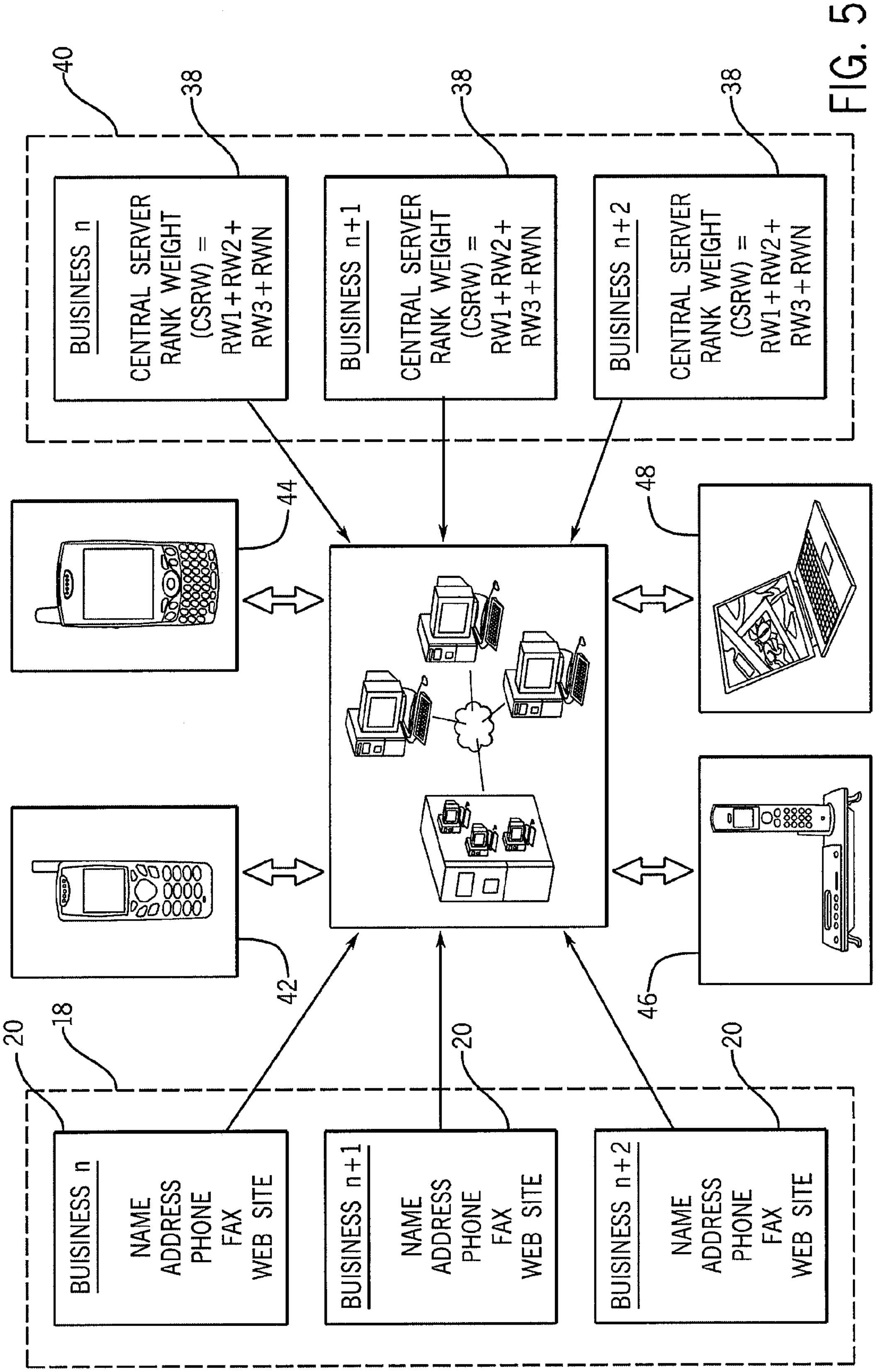
FIG. 5 is a schematic representation illustrating transmission of ranking information for enterprises to remote communication devices maintaining contact information for the enterprises according to one aspect of the invention.

Thus, when contact information of an enterprise is downloaded to and stored in the remote communication device, such as disclosed in our U.S. Ser. No. 11/164,318, the rank weight for the enterprise is also downloaded. More particularly, as schematically shown in FIG. 5, the contact information for an enterprise is accessed from database 18 and the rank weight information 38 for that enterprise is accessed from database 40 by the server and then communicated using known communication techniques to the communication device, such as mobile phone 42, landline phone 44, PDA 46, or computer 48. The contact information and the rank weight information may be displayed on the display screen of the communication device and/or stored in memory of the communication device for subsequent retrieval. In one embodiment, the information is saved in the contact list or "phone book" of the communication device is updated. It is contemplated that the rank weight may be updated at regular intervals via software downloads from the central server 12. In one implementation, the downloads are completed automatically during low use intervals. As disclosed in U.S. Ser. No. 11/164,318, a caller may then search for contact information of enterprises from within the contact information database stored in the contact list of the communication device. The results of that search are then preferably sorted based on the rank weight of each result; although it is contemplated other sorting factors may be used. It is contemplated that a caller may place limitations on the search so that enterprises with a rank weight above a threshold are returned.

Figure 6:
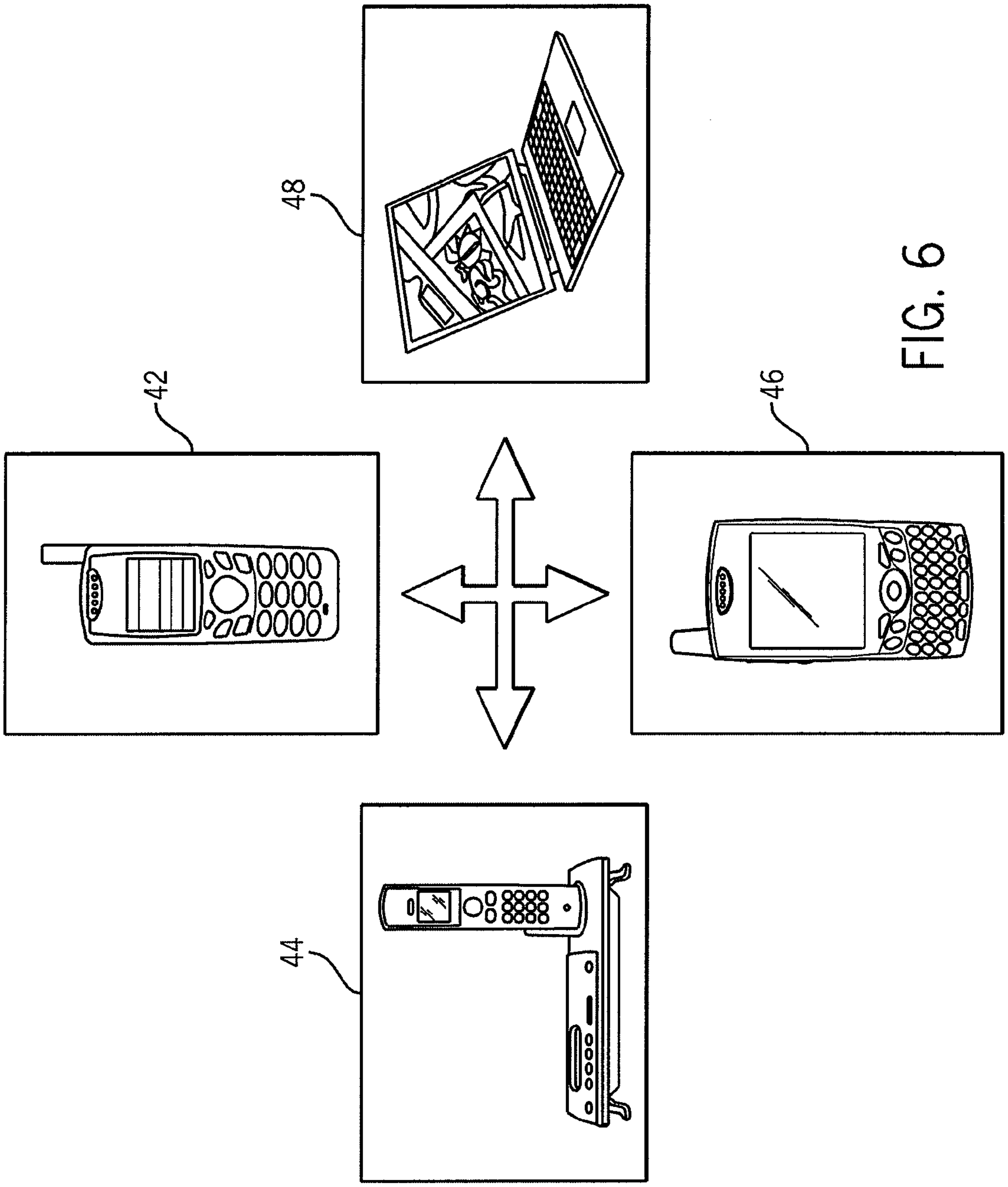
FIG. 6 is a schematic representation illustrating communication between remote communication devices.

Further, as shown in FIG. 6, it is contemplated that the contact and rank weight information may be shared between communication devices in a known manner. This allows the contact and rank weight information to be synchronized.

Figure 7:
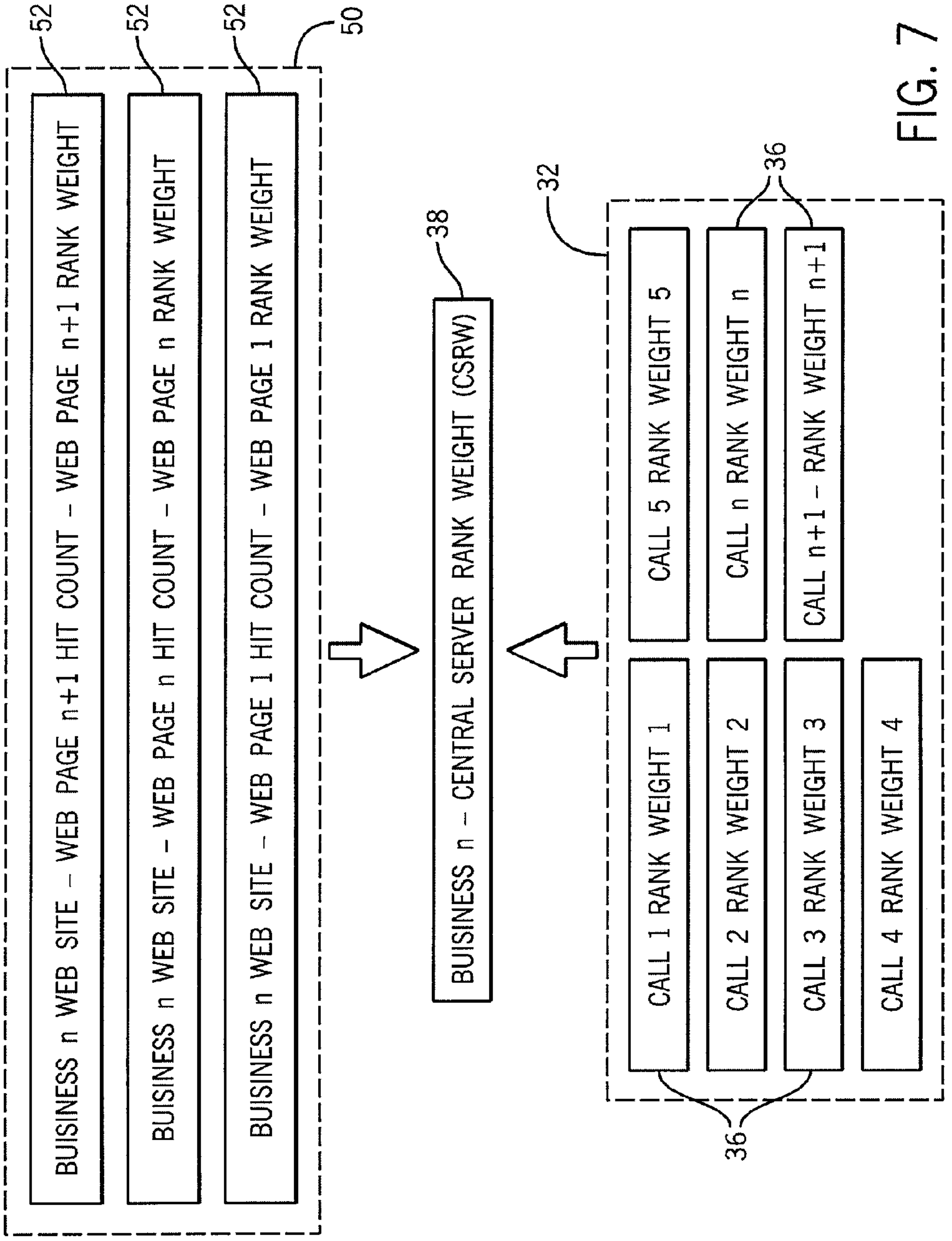
FIG. 7 is a schematic representation of illustrating how a ranking factor is determined for a given enterprise based on telephone calls involving the enterprise and hits to a website for the enterprise according to a further aspect of the invention.

According to another aspect of the invention, as shown in FIG. 7, the rank weight of an enterprise may include other factors in addition to those derived from telephone calls. For example, website traffic may be included in the determination. In this regard, website traffic information may be accessed from a website host, or database 50 maintained by the website host. During regular intervals, website "hit" count information, represented by blocks 52 may be transmitted to or accessed by the centralized server 12 and used to calculate the rank weight for the enterprise. It is also contemplated that the website traffic information can be provided by a third party.

A number of factors may be used to determine a weighting factor based on website traffic. For example; order confirmation web page hits may be given greater weight than home page hits.

Figure 8:
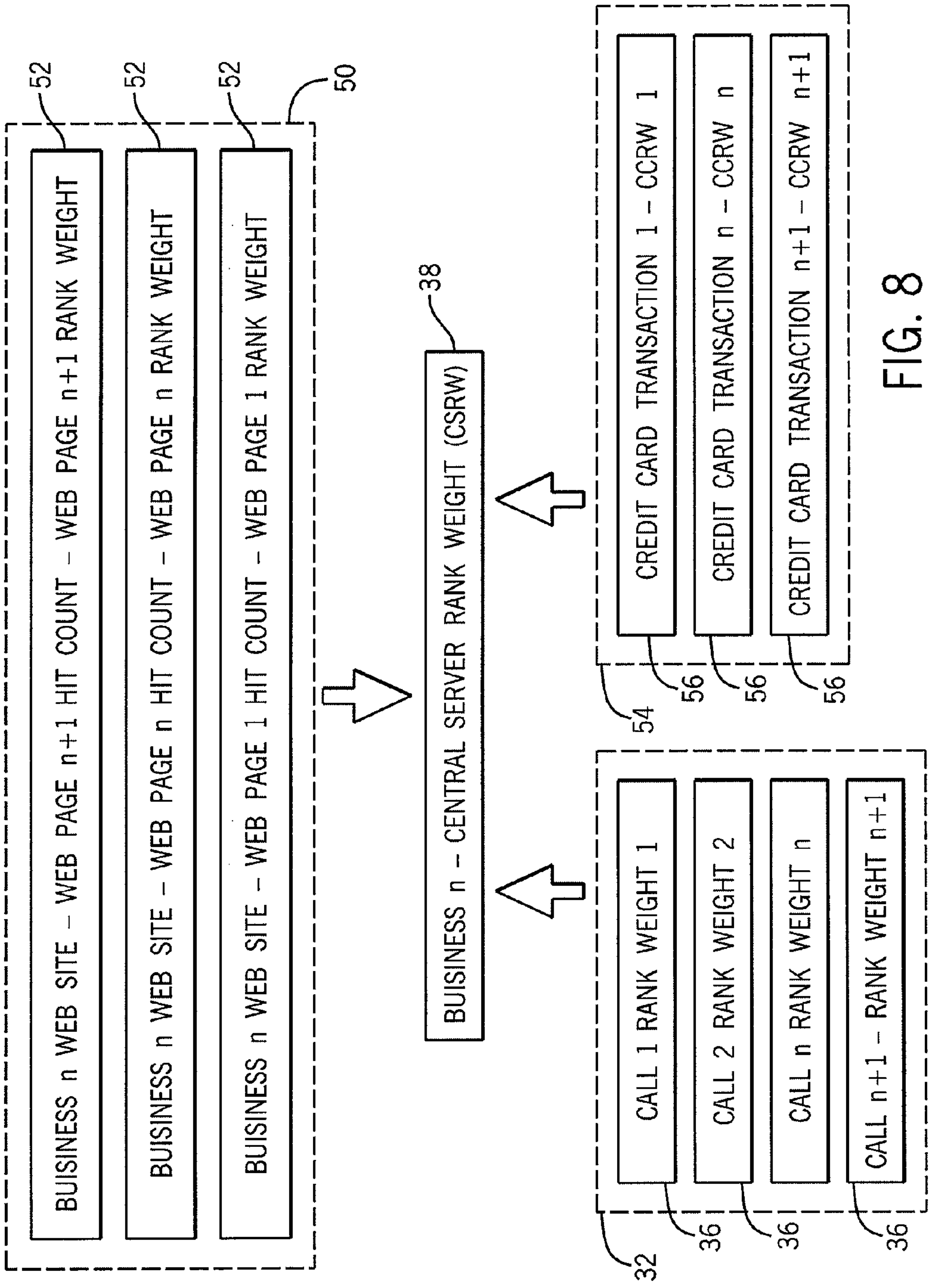
FIG. 8 is a schematic representation of illustrating how a ranking factor is determined for a given enterprise based on telephone calls involving the enterprise, hits to a website for the enterprise, and credit card transactions involving the enterprise according to yet another aspect of the invention.

Referring now to FIG. 8, credit card transactions may be used as a factor in determining the rank weight for an enterprise. In this regard, the present invention recognizes the number of credit card transactions for an enterprise as an indication of that enterprise's sales and, thus, as an indirect indication of that enterprise's popularity. In FIG. 8, number of credit card transaction data is provided by or otherwise accessed from credit card issuers, or clearinghouses for credit card issuers. In one implementation, each credit card transaction involving an enterprise is logged and stored in a known manner. The database, which may be maintained by the credit card issuers, a clearinghouse, or other third-party, is accessed by the central server to obtain credit card transaction data.

To comply with confidentiality laws and regulations, as well as cardholder agreement terms, personal information for each credit card transaction is not recorded; only that a transaction has occurred and other non-personal information associated with that transaction, such as postal code of the cardholder. It is recognized that other census type, not personal information associated with the transaction could be recorded and used to assign a rank weight to the transaction. The central server stores the transaction data and assigns a rank weight to each transaction and stores each ranked transaction in one or more databases 54. The ranked transactions, and the rank weight associated therewith, are maintained as fields 56 in the database 54. The database 54 is updated in a known manner. For purposes of this application, credit card transactions includes debit card transactions, bank draft (check) transactions, and any other electronic (non-cash) transaction.

As shown in FIG. 8, the credit card transaction rank weight information, the telephone call rank weight information, and the webpage traffic rank weight information is used to determine an overall rank weight 38 for each enterprise.

As noted above, in one preferred embodiment, the credit card information is provided by the credit card issuers, but is understood that the credit card information could be captured in one of a number of known techniques. For example, the transaction information could be captured from the enterprise at the time of the transaction using a call interceptor similar to that described above with respect to capture telephone call information. In this regard, credit card processor and/or point of sale systems are equipped with a call interceptor that includes a modem and a memory card. These devices capture, store and transmit credit card information and ID information for the enterprise directly to the central server.

Cash transactions may also be an indicator of business popularity. In this regard, it contemplated that point of sales systems (POS) may be used to transmit cash transaction information to the central server. Cash transaction information may also be transmitted to the central sever across wired or wireless data communication channels. In one representative example, each instance that the drawer of the cash register is accessed, a corresponding signal is transmitted to the central server. The cash register has a corresponding ID and the signal is transmitted with the ID, which allows the central server to associate the drawer access instance with the contact information for the enterprise associated with the cash register. It is also contemplated that the signal transmitted by the cash register may be encoded with the amount of the transaction. It is further contemplated that purchaser information could be associated with the cash transaction and encoded into the signal, such as postal code or area code. This cash transaction information may then be used in establishing a rank weight for the enterprise that takes into account non-electronic point-of-sale transactions.

It understood that the rank weight for an enterprise may be determined from information other than or in addition to telephone calls, website hits, and credit card transactions. For example, other factors that may be used to assess the popularity of an enterprise may includes sales tax, income tax, number of employees, revenue, profit, customer (foot) traffic, geographic location, payroll taxes, total wages, etc. There may be any number of criteria for assigning rank weights and the list should not be in any way considered exhaustive and by no means be considered limiting. Additionally, it is understood that the information for determining popularity may be captured automatically, manually from a third party, or manually from the enterprises themselves.

Figure 9:
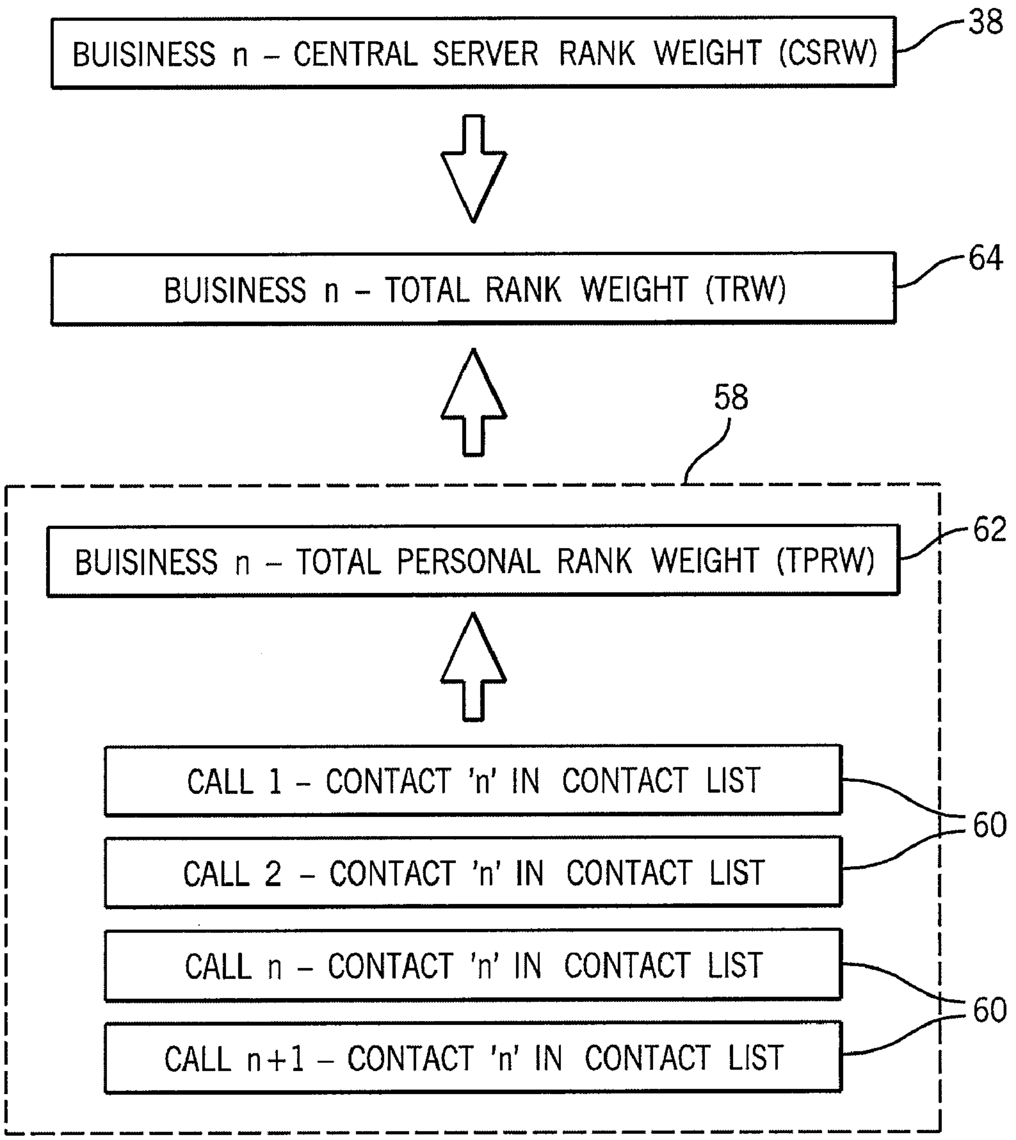
FIG. 9 is a schematic representation illustrating how a personal ranking factor is determined for a given enterprise according to yet a further aspect of the invention.

Referring now to FIG. 9, according to another aspect of the invention, personal rank weight is assigned to contact information at the level of the communication device. Contact information of local businesses is downloaded and saved in the contact list of communication device, as described above. A personal rank weight is assigned to contact information contained in the contact list every time the contact information is used by caller. That is, a memory device within the mobile communication device maintains a personal rank weight database 58 for each listed enterprise. That database 58 is updated each time a caller places a call 60 to the corresponding enterprise. The sum total of calls is used to determine a total personal rank weight 62 for the enterprise.

During a query of enterprises represented in the locally stored contact list, the results may be returned based solely on the personal rank weight 62, the rank weight assigned by the central server 38, or a combination of the two, i.e., total rank weight 64. The personal rank weight therefore takes into consideration the particular call history of the mobile communication device when returning the results of a search query.

It is recognized that additional factors in addition to rank weight may be used to display the results of a contact list search query. For example, proximity to the placed call or some other geographical location may be used to sort the search results in a known manner. In another example, contact information for enterprises contained in a list in response to a user query may be sorted according to instances of electronic communication contained in the call log for the corresponding enterprises.

Additionally, it is recognized that the invention may be extended to the presentation of contact information for enterprises in printed publications. For example, "popularity" data may be acquired as described herein and enterprises listed in a printed telephone directory, or electronic version thereof, based on a rank weight instead or in addition to alphabetically.

According to another aspect of the invention, web pages corresponding to enterprises generated in response to an online query are ranked according to the 'central server rank weight' (or total rank weight) of corresponding enterprises. This feature makes online search results more robust as it takes into account not only online popularity of businesses into account; but also takes into account popularity of business in telephony and other offline environments.

Figure 10:
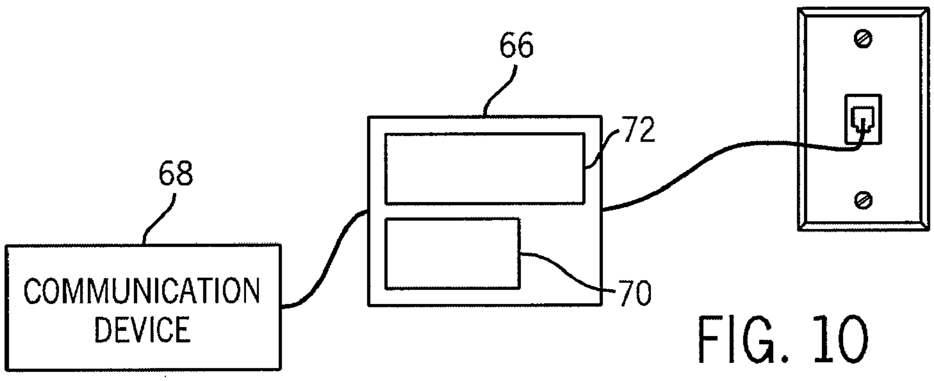
FIG. 10 is a schematic representation of a communication device and call interceptor device for use with the present invention.

Referring now to FIG. 10, a representative call intercepting device 66 that intercepts electronic communications to and from a communication device 68, which may include telephones, computers, credit card terminals, and similar devices used for electronic communications. The call intercepting device 66 includes a modem 70 and a memory card 72. The call intercepting device 66 is programmed to capture incoming and outgoing identification information, such as telephone number, and save that information in the memory card 72. The call intercepting device 66 is also programmed to transmit the stored identification information saved in the memory card 72 to the central server at predetermined intervals. As noted above, the information may alternately be transmitted with each of electronic communication or when polled by the central server.

It is to be understood that the invention is not limited in its application to the details of construction and to the arrangements of the components set forth in the foregoing description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out one or several purposes of the present invention. It is important, therefore, that the claims be regarded as including such equivalent constructions insofar as they do not depart from the spirit and scope of the present invention.

I claim:

1. A method comprising:

accessing data indicating instances of electronic communication with an enterprise;

determining a ranking factor for the enterprise based on a statistical evaluation of the number of instances of electronic communication with the enterprises;

associating the ranking factor with contact information for the enterprise;

displaying on a communications device the contact information sorted according to the ranking factor for the enterprise on a display screen of a communication device;

counting the number of telephone calls and storing the number of telephone calls in a central database; and generating an acceptance criteria by omitting a selected portion of the instances of electronic communication with the enterprise, wherein accessing data includes tracking a number of telephone calls associated with the enterprise.

2. The method of claim 1 further comprising searching a contact list stored on the communication device and displaying results of the search on the communication device sorted by the ranking factor.

3. The method of claim 1 further comprising updating the number stored on the central database each time a telephone call involving the enterprise occurs.

4. The method of claim 1 wherein accessing data includes tracking a number of credit card transactions with the enterprise.

5. The method of claim 4 further comprising counting the number of credit card transactions and storing the number in a central database.

6. The method of claim 5 further comprising updating the number stored on the central database each time a credit card transaction with the enterprise is conducted.

7. The method of claim 1 wherein accessing includes tracking a number of hits to a website for the enterprise.

8. The method of claim 7 further comprising counting the number of hits and storing the number in a central database.

9. The method of claim 8 further comprising updating the number stored on the central database at regular pre-defined intervals.

10. The method of claim 1 wherein the ranking factor is determined from a sum of the number of instances of electronic communication with the enterprise.

11. The method of claim 10 wherein the electronic communication includes telephone calls received or placed by the enterprise, credit card transactions with the enterprise, and hits to a website for the enterprise.

12. The method of claim 1 further comprising updating the ranking factor associated with the enterprise and transmitting the updated ranking factor to a communication device maintaining contact information for the enterprise.

13. The method of claim 1 further comprising saving at least one of the contact information for the enterprise and the ranking factor for the enterprise in a central database.

14. The method of claim 1 further comprising saving at least one of the contact information for the enterprise and the ranking factor for the enterprise in memory of the communication device.

* * * * *